United States Patent
Loughran, Jr.

[11] 3,872,469
[45] Mar. 18, 1975

[54] MAGNETICALLY ACTUATED INDICATOR

[75] Inventor: Eugene F. Loughran, Jr., Oakville, Conn.

[73] Assignee: North American Philips Corporation, New York, N.Y.

[22] Filed: Nov. 3, 1969

[21] Appl. No.: 873,493

[52] U.S. Cl. ............................................. 340/373
[51] Int. Cl. ......................................... G08b 23/00
[58] Field of Search........ 340/373, 376, 378 R, 381, 340/382

[56] References Cited
UNITED STATES PATENTS

| | | | |
|---|---|---|---|
| 3,118,138 | 1/1964 | Milas et al. ........................ | 340/378 |
| 3,364,481 | 1/1968 | Fuzzell ............................... | 340/373 |
| 3,430,170 | 2/1969 | Shatas et al. ....................... | 340/373 |
| 3,487,403 | 12/1969 | Pihl ..................................... | 340/373 |

FOREIGN PATENTS OR APPLICATIONS

| | | | |
|---|---|---|---|
| 956,702 | 1/1957 | Germany ........................... | 340/373 |
| 1,224,994 | 6/1960 | France ............................... | 340/373 |

*Primary Examiner*—Robert L. Griffin
*Assistant Examiner*—George G. Stellar

[57] ABSTRACT

A fault indicator capable of being built in microminiature size comprises a rotatable indicating member having pivotal supports and containing visual markings for indicating the presence of one of two possible conditions in an operational system. The member which may be spherical is linked magnetically to a fixed part of the system by a permanent magnet which is embedded therein to magnetically interact with a fixed electromagnet. Electric current flowing in the coil of the electromagnet produces a mangetic field which directly actuates the indicator. A pair of juxtaposed housing units is provided, at least one unit of which contains journal recesses to receive the supports of the indicating member which supports are to be contained within the recesses by the facing edge of the other housing member. A promontory stop on the indicator limits its rotational angle. The indicator may be movably enclosed within a case attached to a fixed structure and pivoted with fixed magnetic means to set the rotatable member to a particular position, and a spring to return the indicator to an operating position after it has been moved to be actuated by the magnet.

7 Claims, 6 Drawing Figures

3,872,469

3,872,469

MAGNETICALLY ACTUATED INDICATOR

BACKGROUND OF THE INVENTION

Field of the Invention

The invention relates to indicating devices generally and more particularly to microminiature fault indicators which are capable of visually displaying the presence in a system of either of two conditions, which for example may be described generally as favorable or unfavorable.

DESCRIPTION OF THE PRIOR ART

Devices such as that disclosed by U.S. Pat. No. 3,364,481, to indicate the presence of preferred conditions in an operational system, are known to utilize the concept of magnetically linking a rotatable indicator member to a fixed electromagnet. Heretofore the fixed portion of the magnetic link has comprised a pair of magnets, in spaced relation to each other, one being permanent and the other electromagnetic. Energization of the coil of the electromagnet produces a field powerful enough to overcome the field of the permanent magnet and to actuate the rotatable indicator member in which is embedded a second permanent magnet. Deenergization of the coil, as by shutting down the system, allows the field of the first named permanent magnet to attract the indicator member to its preactuated position. In view of the frequent need to retain a given indication of a particular characteristic of the system to which the indicator is attached, the tendency of indicator members in prior art devices to return to a previous indicating position upon deenergization of the coil is unfortunate.

Another limitation of the known indicator devices is their size, in that they are especially intended to function in systems which do not impose severe space limitations. In such indicators the rotatable member is large enough to make its assembly a relatively simple and inexpensive task. For example with respect to indicators of the type usually mounted on the dash or indicator panel of motor vehicles, aircraft, earth moving equipment or power units, it is relatively easy to provide conventional, separately assembled axles and visual markings on the indicating member, which may then be fixed into a one-piece housing unit. To manufacture microminiature fault indicating devices in this way however would be either impossible or exorbitantly expensive.

The present invention uses a rotatable indicating member having stub axles which are enclosed within journal recesses contained in one of a pair of juxtaposed housing members. A promontory stop is provided to limit the rotational angle of the indicator member and a method is provided for applying visual markings thereto. The indicating member which is usually spherical contains a permanent magnet which is embedded in the center thereof with its longitudinal axis being perpendicular to the rotational axis of the sphere. The permanent magnet interacts magnetically with a fixed electromagnet which produces a magnetic field directly to actuate the spherical indicator. The ends or poles of the permanent magnet may be either cone-shaped or pyramidal for the purpose of reducing any tendency of the permanent magnet to remain locked in one position in relation to the fixed electromagnet when the latter is energized. Absent the electromagnetic field the permanent magnet will tend to align itself with the core of the fixed electromagnet such that its longitudinal axis is several degrees short of colinearity with that of the core. Interaction between the field of the permanent magnet and that of the energized electromagnet results in both a linear repelling force and a rotational torque being applied to the permanent magnet causing the sphere to rotate to an alternate position thereby to indicate an alternate condition in the system. The indicator may be reset to one of its conditions by means of a permanent magnet attached to a housing in which the indicator is movably held or by reversing the field of the electromagnet. A spring urges the indicator and magnet apart after resetting.

It is one object of the present invention to provide a miniature electromagnetic indicating device of sufficient structural simplicity to make the manufacturing thereof simple and economical.

Another object of the present invention is to provide an electromagnetic indicating device which will maintain an assumed indicating position until current of appropriate polarity is passed through the coil of the electromagnet to reset the device.

Still another object of the present invention is to provide an electromagnetic indicating device which is manually resettable.

A further object of the present invention is to provide a method for applying visual markings to the rotatable indicator member.

BRIEF DESCRIPTION OF THE DRAWINGS

For a better understanding of the present invention drawings is made to the accompanying drwings in which.

DESCRIPTION OF THE PREFERRED EMBODIMENTS

Figure 1:
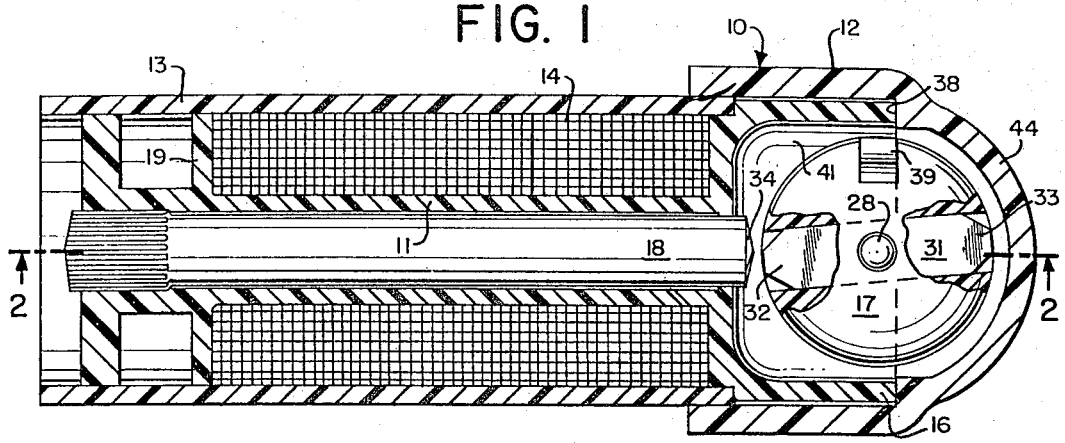
FIG. 1 is a top plan sectional view of one embodiment of the assembled indicating device.
Figure 2:
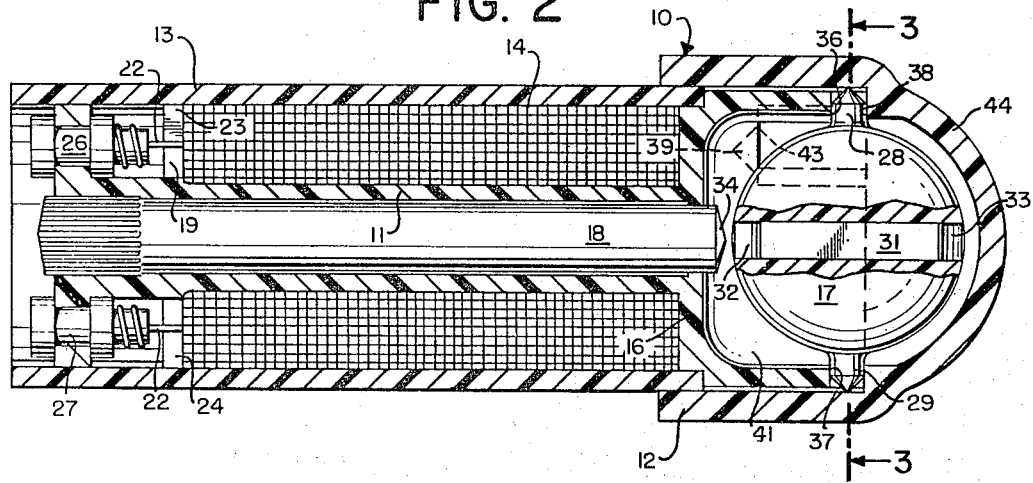
FIG. 2 is a side elevated sectional view of the assembled indicating device of FIG. 1.

Referring now to the drawings and in particular to FIGS. 1 and 2, the microminiature fault indicator, generally denoted by reference numeral 10 comprises an inner support structure 11, a cap-like housing member 12 which is juxtaposed to the support structure, and a cylindrical housing member 13. The cylindrical member 13 surrounds approximately ¾ of the device and encloses a coil 14 wound on one portion of the support structure 11. The support structure comprises in general a hollow cylinder the diameter of which does not remain constant throughout its length with the result that one end comprises a substantially enlarged open-ended socket 16 which partially encloses a spherical rotatable indicating member 17. A ferromagnetic core 18 is inserted within the long and relatively narrow bore of the support structure 11. A radially extending disc 19 at the other end of the support structure and integral therewith together with the radially extending surface area of the socket 16 define a cavity 21 (FIG. 4) within which the coil 14 is situated. Leads 22 of the coil exit from the device through a pair of slits 23 and 24 in the radial disc of the support structure and may be soldered to respective terminals 26 and 27. To complete the enclosure of the spherical indicator 17 which is contained partially within the open-ended socket 16 the cap-like housing member 12 is fitted in juxtaposition to the socket thereby rotatably to secure the indicator in its operating position.

In the preferred embodiment illustrated the rotatable indicating member 17 comprises a sphere which is supported on a pair of integral stub axles 28 and 29, preferably molded out of the same material of which the ball is constructed. A permanent bar magnet 31 is embedded within the ball equidistant from the pivot points of the two stub axles 28 and 29, with its longitudinal axis being perpendicular to the rotational axis of the sphere. Each end or pole 32 and 33 of the bar magnet 31 may be either cone-shaped or pyramidal, but in general will be somewhat tapered, and one pole will be in proximity to the core 18 of the electromagnet at each indicating position of the sphere. The facing end, or pole, 34 of the core of the electromagnet may be substantially cone-shaped, the effect of which would be to minimize any tendency of the bar magnet 31 to remain locked in one position with respect to the pole 34 when the electromagnet is energized. In the absence of an electromagnetic field the bar magnet will tend to align itself with respect to the pole 34 of the electromagnet such that its longitudinal axis is approximately 5° short of colinearity with the longitudinal axis of the core. Interaction between the field of the permanent magnet and that of the electromagnet when energized results in a repelling force which is additive to the torque developed as the permanent magnet, and therefore the sphere, begin to rotate to the alternate position to indicate an alternate condition in the system. Other advantages of arranging the rest positions of the bar magnet to be short of null with respect to the core will be made more clearly apparent below.

Figure 3:
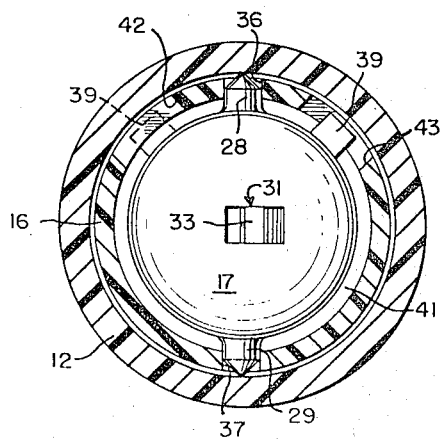
FIG. 3 is a front cross sectional view of the indicator member mounted within the housing of the device.
Figure 4:
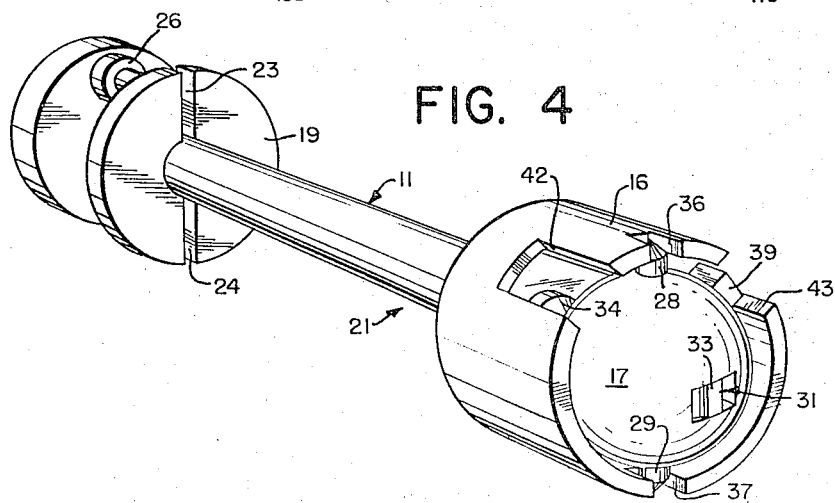
FIG. 4 is an elevated view of the inner support structure including the rotatable indicator shown mounted at one end.

Referring now to FIGS. 3 and 4 it may be seen that a pair of journal recesses or slots 36 and 37 are provided in the facing edge of the socket 16 on the support structure 11. These recesses are substantially U-shaped and are situated diametrically opposite each other across the open end of the socket, each to receive a respective one of the integral stub axles 28 and 29 of the indicator sphere. The actual pivot points for the axles are provided by the inner circumference of the cap-like housing member 12 which is also substantially cylindrical in shape, its open end to fit concentrically over the facing edge of the support structure to enclose the axles and capture the sphere in its operating position. As illustrated best in FIG. 2, the axles of the sphere are contained within their respective recesses or slots by a ledge 38 around the inner circumference of the cap 12, which abuts the facing edge of the socket thereby to close the open ends of the slots 36 and 37.

A promontory stop 39 is provided on the sphere to limit the latter's rotational angle. As illustrated in FIG. 3 the stop may be located on the circumference of the sphere by a line longitudinal with respect to the stop, through the center of the sphere and at an angle of substantially 45° to the sphere's rotational axis. The cavity within which the sphere is to rotate is defined by the juxtaposed members 11 and 12, and that portion of the cavity contributed by the socket 16 is enlarged, as indicated by reference numeral 41, sufficiently to allow the sphere and its stop to rotate freely through the halfway point of a total permissible rotational arc of approximately 180°. As is clear from FIGS. 2 and 4 however a second pair of U-shaped recesses or slots 42 and 43 must be provided in the support structure 11 to make room for the stop as the sphere is rotated approximately 180° to a position defined by the circumferential ledge 38 which intercepts the stop to limit the rotational angle of the sphere.

The alternate rest positions for the stop are illustrated in FIG. 3. At each position, approximately one hemisphere of the indicator is visible through a transparent convex portion 44 of the cap 12 which forms the viewing end of the device. During either rest position of the sphere the stop is in contact with the inner ledge 38 of the cap. As has been described above, when the electromagnet is de-energized the bar magnet will tend to align itself with respect to the core 18 such that its longitudinal axis is approximately 5° short of colinearity with the longitudinal axis of the core. The magnetic attraction between the permanent bar magnet within the sphere and the steel of the core, biases the sphere in such a way as to force the stop against the ledge 38. This biasing has the advantage of minimizing any tendency of the sphere to "skitter" around if it happens that the device has been placed in a vibration environment.

Figure 5:
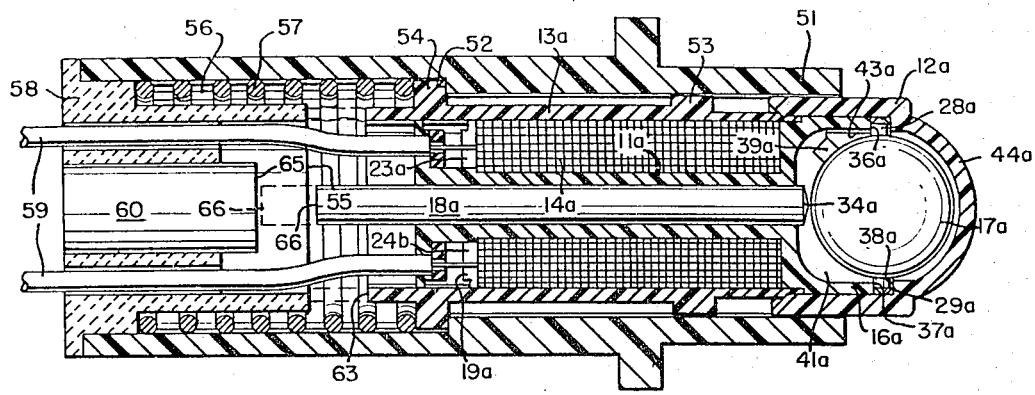
FIG. 5 is a side elevated sectional view of a second embodiment of the present invention showing a manually resettable indicator.
Figure 6:
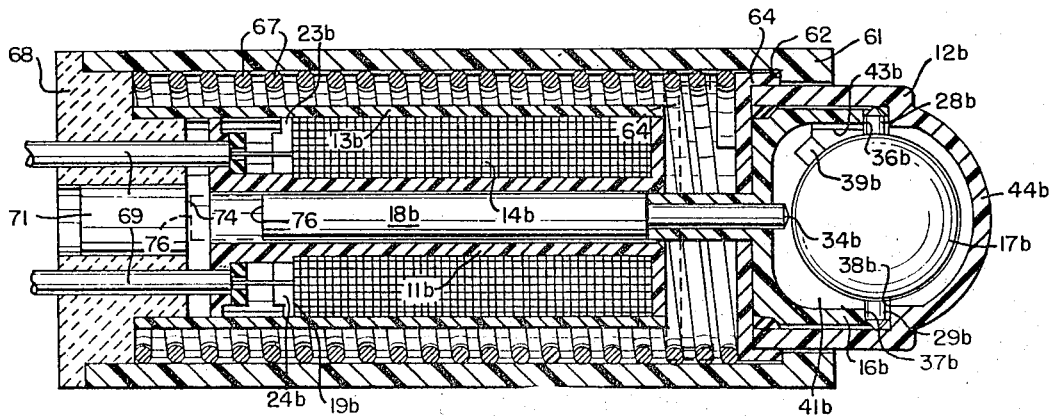
FIG. 6 is a side elevated sectional view of a third embodiment of the present invention showing another form of a manually resettable indicator.

FIGS. 5 and 6 respectively, illustrate a pair of separate embodiments of the present invention, both of which relate to a device for manually resetting the actuated spherical indicator to its preactuated position. In the absence of such a manually operable mechanism, it would be necessary to reverse the polarity of current through the coil in order to return the indicator to its preferred position or to form coil 14 as a two-part coil, such as a bifilar coil, and pass current through one coil section to rotate the indicator one way and through the other section to rotate it the opposite way. In the embodiment illustrated by FIG. 5, the microminiature fault indicator as described above is slidably arranged within a hollow enclosure 51, the inner circumference of which contains an abutment ledge 52 located part way along the length of the enclosure. The cylindrical housing member 13a of the indicator is provided with a pair of raised portions 53 and 54 along its surface area for the purpose of making sliding contact with the inner surface of the enclosure 51. The reach of the latter portion is somewhat greater than that of the former and it is arranged to slide along an area of the enclosure, indicated by reference numeral 56, having a slightly enlarged inner diameter which is defined by the abutment edge 52. The fault indicator device therefore when inserted within the enclosure 51 will be able to slide back and forth, limited in one direction by contact between the raised portion 54 and the abutment edge 52. One end of a coil spring 57, the diameter of which is slightly less than that of the inner area 56 of the enclosure, is arranged to abut the raised portion 54, while the other end of the spring is compressed by a plug 58, which is contained within one end of the enclosure, to bias the indicating mechanism toward the opposite end. The plug contains several bores to allow leads 59 to pass through, and embedded in the plug is a fixed permanent magnet 60 the longitudinal axis of which is colinear with that of the ferromagnetically soft steel core 18a of the electromagnet in the indicating mechanism. An abutment edge 55 is provided on the plug to define the extent of allowable movement of the indicating mechanism, by intercepting the end 63 of the cylindrical housing 13a. In the rest position, where the spring 57 biases the indicating mechanism in one direction so that the raised portion 54 of the housing 13a abuts against the edge 52 of the enclosure, the distance between the abutment edge 55 of the plug and the end 63 of the housing 13a is slightly less than the distance between pole 65 of the magnet 60 and pole 66 of the core 18a. When the indicating mechanism is moved, against the bias of the spring 57, so that the edges 55 and 63 come into contact with each other, the pole 66 moves very close to the pole 65, as indicated by the broken lines in FIG. 5. The result is that the magnetic field of the magnet 60 induces a magnetic pole of polarity opposite to that of the pole 65 in the proximal end 66 of the core 18a whereby the other end 34a of the core assumes the same magnetic polarity as the pole 65 and actuates the spherical indicator 17a to cause it to return to a favorable indication. As the core 18a is subsequently forced by the spring away from the fixed magnet 60 when pressure on the cap 12a is released, the air gap between them increases, thereby decreasing the magnetic interaction and allowing the end 34a to become subject to the weaker magnetic field of the bar magnet embedded in the spherical indicator 17a.

With respect to the embodiment illustrated in FIG. 5, it was found that under certain circumstances, movement of the leads 59 during reset was not always desirable. Therefore, in the embodiment shown in FIG. 6, the fixed portion of the device includes not only the permanent magnet 71, but also the coil 14b and its leads 69. In this embodiment these components have been mounted within a fixed cylindrical enclosure 13b provided with a central bore within which the ferromagnetically soft core 18b is slidably arranged. The core is attached to the support structure 11b, which, together with the cap 12b, is slidably positioned within one end of the cylindrical housing unit 61. The diameter of the unit 61 narrows at this open end to provide an abutment edge 62 which serves the same purpose as does the edge 52 in the embodiment illustrated in FIG. 5. A shallow cup 64 on the support structure cooperates with the abutment surface 62 and provides a contact surface for the biasing spring 67. For an understanding of the operation of the present embodiment reference may be had to the description above relating to FIG. 5.

The present invention suggests a method by which the tiny spheres necessary for microminiature fault indicators may be inexpensively marked. The surface of the ball may be colored or otherwise marked in various ways, for example, the hemisphere exposed in one position may be colored in one way, as with black, red or orange, while the other half is colored in a different way, e.g. white. It may be established therefore that the red, black or orange side is normally to be associated with a negative or unfavorable condition, and white with a favorable condition, so that the operator will be apprised on seeing white that a favorable condition prevails or on seeing red, orange or black that an unfavorable condition prevails. To facilitate the application of such color the structure of the device itself may be employed. The sphere is first placed into operating position in relation to the support structure 11, that is, with the stub axles engaging the diametrically opposed slots 36 and 37. The cap 12 is not fitted at this time. Magnetic means, either the electromagnet of the device or another, may be used to hold the sphere in one of its positions, and color may then be applied to the exposed hemisphere. Thereafter, the magnet means will be energized to rotate the sphere to its other position wherein color may be applied to the other hemisphere. The cap 12 may then be fitted to hold the sphere in place. As an alternative to the first-named method, the sphere may be molded in two sections, separately colored, and ultrasonically or chemically welded together. The steel magnet insert may be press fit into one or both hemispheres either prior or subsequent to the welding process.

In operation, the device in FIGS. 1 and 2 may indicate a favorable condition in the system when the coil 14 is not energized. In this circumstance the magnetic field of the permanent magnet 31 in the sphere interacts with the core 18 of the electromagnet to hold the ball in one arbitrary indicating position. When the coil, or one section thereof, in the case of a bifilar coil, is electrically energized, as when an unfavorable condition develops in the system, electromagnet pole 34 assumes a polarity the same as that of the magnetic pole 32. Since like poles repel, the magnetic pole 32 and hence the sphere are magnetically urged to rotate from the position illustrated in FIG. 1 to an opposite position. The stop 39 insures that the sphere will rotate approximately 180° to its alternate indicating position wherein the bar magnet 31 will again stop approximately 5° short of colinearity with the longitudinal axis of the core 18. When the coil 14 is de-energized, as by shutting down the system, the magnetic field of the electromagnet collapses. This allows the magnetic field of the bar magnet 31 to interact with the electromagnet pole 34, now without polarity.

The result is that the magnet 31 will remain in this alternate position, with the sphere indicating for example an unfavorable condition in the system, until the electromagnet is energized either by reversing current flow in the coil 14 or supplying current in the other section of a two-part coil to cause pole 34 to assume a polarity the same as that of the permanent magnet pole 33. The pole 33 will be repelled, and hence the sphere 17 will rotate to the first described position, thus to reset the device. The advantage is that the device will reset only when desired, thus reducing the possibility of overlooking a potential fault in the system.

To manually reset a mechanism adapted for such use, as the mechanism in FIGS. 5 and 6, it is merely necessary to push against the convex portion 44 so that the ferromagnetic core 18a (FIG. 5) moves very close to the fixed magnet 60. The field of this magnet is powerful enough to induce a magnetic polarity at the pole 34a of the core which will repel the nearby pole of the bar magnet and urge the sphere to rotate back to a favorable indicating position.

What is claimed is:

1. An electromagnetic device to indicate the presence of either a first condition or a second condition in a system, said device comprising:
   a first housing structure;
   a second housing structure movable back and forth in one direction with respect to said first housing structure and partially enclosed by said first housing structure and comprising, a rotatable member having integral stub axles to pivot approximately 170° between a first rest position to indicate said first condition and a second rest position to indicate said second condition in said system and comprising an elongated bar permanent magnet secured within and extending substantially diametrically across said rotatable member, an electromagnet comprising a coil and an elongated ferromagnetically soft core adjacent said permanent magnet whereby a magnetic field produced in said core by said coil interacts with said permanent magnet to rotate said rotatable member, and first and second juxtaposed units, said first juxtaposed unit comprising an open-ended receptacle for said rotatable member and said second juxtaposed unit comprising a cover fitting over said receptacle to enclose said rotatable member and having a transparent surface conforming to the surface of said rotatable member, at least one of said juxtaposed members having journal recesses open at the side facing the other of said juxtaposed members to receive said stub axles, said other of said juxtaposed members being positioned with respect to said recesses to capture said stub axles therein whereby said rotatable member is able to pivot between said first and second rest positions and remain in either of said rest positions, said second juxtaposed member comprising stop surfaces to engage said promontory stop at the ends of its range of travel;

permanent magnetic means affixed to said first housing structure;

and spring biasing means pressing on said first and second housing structures to bias said core away from said permanent magnet, said second housing structure being movable against said spring bias to bring said core sufficiently close to said permanent magnet to induce a predetermined magnetic field in said core to attract said rotatable member to a predetermined one of its rest positions.

2. An electromagnetic device to indicate the presence of either a first condition or a second condition in a system, said device comprising:

a first housing structure;

a second housing structure movable back and forth in one direction with respect to said first housing structure and partially enclosed by said first housing structure and comprising, a rotatable member having integral stub axles to pivot approximately 170° between a first rest position to indicate said first condition and a second rest position to indicate said second condition in said system and comprising an elongated bar permanent magnet secured within and extending substantially diametrically across said rotatable member, an elongated ferromagnetically soft core adjacent said permanent magnet whereby a magnetic field produced in said core interacts with said permanent magnet to rotate said rotatable member, and first and second juxtaposed units, said first juxtaposed unit comprising an open-ended receptacle for said rotatable member and said second juxtaposed unit comprising a cover fitting over said receptacle to enclose said rotatable member and having a transparent surface conforming to the surface of said rotatable member, at least one of said juxtaposed members having journal recesses open at the side facing the other of said juxtaposed members to receive said stub axles, said other of said juxtaposed members being positioned with respect to said recesses to capture said stub axles therein whereby said rotatable member is able to pivot between said first and second rest positions and remain in either of said rest positions, said second juxtaposed member comprising stop surfaces to engage said promontory stop at the ends of its range of travel;

permanent magnetic means affixed to said first housing structure;

a coil rigidly attached to said first housing structure and surrounding said core to induce a magnetic field in said core when current flows in said coil;

and spring biasing means pressing on said first and second housing structures to bias said core away from said permanent magnet, said second housing structure being movable against said spring bias to bring said core sufficiently close to said permanent magnet to induce a predetermined magnetic field in said core to attract said rotatable member to a predetermined one of its rest positions.

3. An electromagnetic device to indicate the presence of either a first condition or a second condition in a system, said device comprising:

a rotatable member having integral stub axles and arranged to pivot approximately 170° between a first rest position to indicate said first condition and a second rest position to indicate said second condition in said system;

an elongated bar permanent magnet secured within and extending substantially diametrically across said rotatable member;

an electromagnet comprising a coil and an elongated ferromagnetically soft core having one tapered end adjacent said permanent magnet, whereby a magnetic field produced in said core by said coil interacts with said permanent magnet;

a promontory stop on said rotatable member;

and a housing comprising first and second juxtaposed members, said first juxtaposed member comprising an open-ended receptacle for said rotatable member and said second juxtaposed member comprising a transparent cover fitting over said receptacle to enclose said rotatable member and having a rounded transparent surface conforming to the surface of said rotatable member, at least one of said juxtaposed members having journal recesses open at the side facing the other of said juxtaposed members to receive said stub axles, said other of said juxtaposed members being positioned with respect to said recesses to capture said stub axles therein, whereby said rotatable member is able to pivot between said first and second rest positions and remain in either of said positions, said second juxtaposed member comprising stop surfaces to engage said promontory stop at the ends of its range of travel.

4. The device of claim 3 in which the ends of said bar magnet are tapered to minimize any tendency to lock magnetically in one of said positions with respect to said ferromagnetically soft core.

5. The electromagnetic device of claim 3 in which each of said juxtaposed members comprises a facing edge, the edge of a first of said juxtaposed members containing said journal recesses, and the edge of a second juxtaposed member comprising a cooperating rasied portion to engage the edge of said first juxtaposed member to capture said stub axles in said journal recesses and to prevent said sphere from pivoting beyond either of said first and second positions.

6. The electromagnetic device of claim 3 in which said stop comprises a projection on said rotatable member and said receptacle comprises a second pair of recesses in the wall of said receptacle adjacent the open end thereof to clear said stop as said rotatable member pivots between said first and second positions, said transparent cover being fitted to cooperate with said stop to prevent rotation of said rotatable member beyond either of said first or second positions.

7. The device of claim 6 in which said second pair of recesses comprise enlarged U-shaped slots, each of said enlarged slots being disposed on one side of one of said journal recesses.

* * * * *